Patented Mar. 11, 1924.

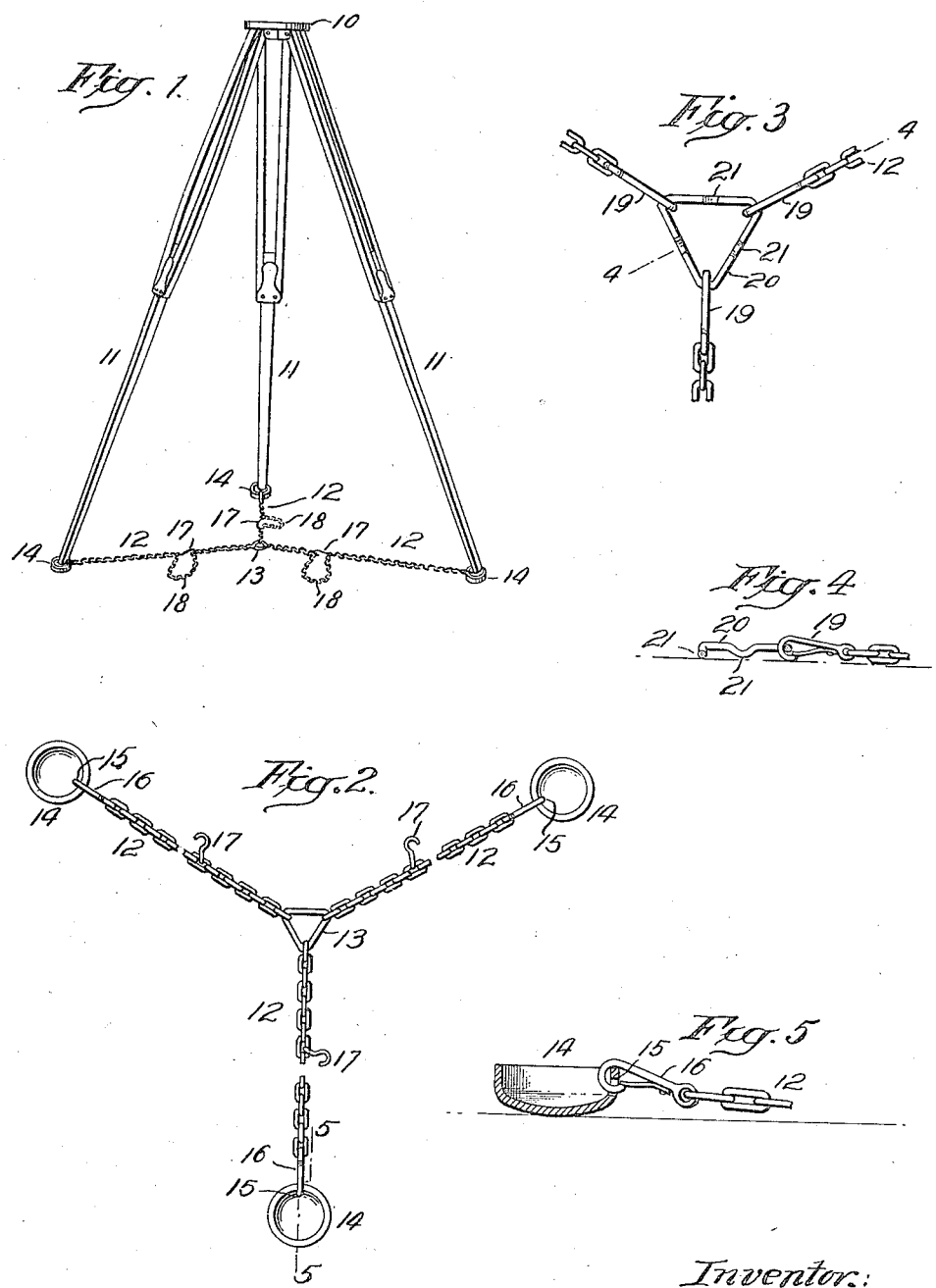

1,486,508

UNITED STATES PATENT OFFICE.

FRANK A. WEEKS, OF PLAINFIELD, NEW JERSEY, ASSIGNOR TO LAURENCE V. COLEMAN, OF WASHINGTON, DISTRICT OF COLUMBIA.

TRIPOD.

Application filed April 6, 1921. Serial No. 459,074.

*To all whom it may concern:*

Be it known that I, FRANK A. WEEKS, a citizen of the United States, and a resident of Plainfield, in the county of Union and State of New Jersey, have invented certain new and useful Improvements in Tripods, of which the following is a specification.

The invention relates to tripods for the use of photographers and other persons, and said invention resides more particularly in the means hereinafter described applied to the lower ends of the foldable legs of the tripod for preventing said legs from slipping in directions from one another or collapsing and for enabling the convenient adjustment of the lower ends of the legs with relation to one another so as to vary the height of the tripod to suit the purposes for which it is to be employed or to meet the wishes of the user. The tripod proper comprises three legs pivotally connected at their upper ends to a head-piece and adapted to be folded together or spread out to support said head-piece at the desired height. My invention consists of three chains connected together at their inner ends on the floor or ground at a central point below the head-piece of the tripod and thence extending outwardly on radial lines to the lower ends of the tripod legs, to which the outer ends of said chains are detachably connected, said chains being correspondingly adjustable as to length so as to vary and control the spread of said legs and consequently the elevation of said head-piece. The chains will lie upon the floor or ground and exert no strain upon the tripod; they serve as a restraint against the undue spreading out or collapsing of the legs of the tripod and as means for regulating the spread of said legs and the height of the head-piece above the floor or other support. The inner ends of the chains will preferably be connected together by a triangular link connection which will facilitate the correct radial positioning of the chains, and the outer ends of the chains will carry the means for their connection with the lower ends of the tripod legs, thus avoiding a special construction of the legs, said means preferably being of ring type and of cup formation into which the lower ends of the legs may be seated and which will facilitate the movement over a floor of the entire tripod and also the movement of the individual legs thereof on the adjustment of said legs toward or from the vertical central axis of the tripod.

The invention will be fully understood from the detailed description hereinafter presented, reference being had to the accompanying drawings, in which:

Fig. 1 is a perspective view of a tripod shown as equipped with the control and regulating features of my invention;

Fig. 2 is a top view, on a larger scale and partly broken away, of the features of my invention shown apart from a tripod;

Fig. 3 is a like view, partly broken away, of a modification of the same, the modification residing in a special central triangular connection and the securing of the inner ends of the chains thereto by snap hooks;

Fig. 4 is a section through the same taken on the dotted line 4—4 of Fig. 3, and Fig. 5 is a sectional view on a larger scale, of one of the leg engaging devices connected with the outer ends of the chains, the section being on the dotted line 5—5 of Fig. 2.

In the drawings 10 designates the head-piece of the tripod, and 11 the three legs thereof, said legs being pivotally connected with or hinged to said head-piece in a customary manner and adapted to be folded inwardly together or spread outwardly as the occasion may require, as usual. The legs 11 may vary in their details of form and construction, as may be desired.

Upon the floor or support for the tripod I apply the tripod-leg positioning means of my invention comprising three chains 12 of corresponding character connected together at their inner ends centrally below the head-piece 10 and extending thence on radial lines to the lower ends of the legs 11 to which the outer ends of said chains are detachably connected. I preferably connect the inner ends of the chains 12 together by means of a triangular ring or link 13, as shown in Figs. 1 and 2, the angular points of the triangle serving as means to conveniently position and equally space apart the inner ends of the chains, as illustrated in Fig. 2. The outer ends of the chains 12 carry the means for detachably engaging the chains with the lower ends of the tripod-legs 11, and these means will preferably be of ring character to extend around the legs and by preference consist of metal cups 14 into which the lower ends of said legs are freely seated and which have smooth downwardly convexed bottom surfaces to engage the floor, as shown more clearly in Fig. 5. The sides of the cups 14 are shown as having near their upper edges, at one side, holes or apertures 15 to receive snap-hooks 16 or other suitable engaging means on the outer ends of the chains 12 and by which the cups and chains may be conveniently associated for the purposes of the invention. The tripod-leg positioning means composed of the chains 12, link 13 and cups 14 may be handled, packed up or stored as an assembled unit, and may be conveniently positioned on a floor to receive the legs 11. When the legs 11 are seated in the cups 14 said legs are prevented by the cups and chains from spreading out or collapsing and hence the tripod does not require any other character of means for maintaining it in position. The cups 11 permit the tripod as a whole to be slid on a floor for changing its position, the operator under such condition taking hold of two of the legs 11 and drawing the tripod to the location desired. The tripod-leg positioning means of my invention permit the legs 11 to be adjusted toward or from one another to vary the height of the tripod, and to carry out this purpose I provide each of the chains 12 with a hook 17 adapted to be engaged with any link of the chain. When the legs 11 are to be adjusted closer together the chains 12 are shortened by looping-up their middle portions, as at 18, Fig. 1, and catching the hooks 17 in the appropriate links to maintain said loops and hold the chains in their shortened condition.

In Figs. 3 and 4, I show the chains as provided with snap hooks 19 to engage a central triangular link or ring 20, which in this instance is preferably bent downwardly in the middle portion of its sides to form feet 21 for leveling the link or ring and keeping its angular portions elevated for the accommodation of the snap-hooks 19.

I do not confine my invention to the details of form and construction hereinbefore described, otherwise than the appended claims and the prior art may require, since I am aware that the details are capable of modification without departure from the spirit of my invention.

What I claim as my invention and desire to secure by Letters-Patent, is—

1. A tripod having foldable legs, and means for positioning and controlling the spread of said legs and to be placed on the floor under the tripod, comprising three flexible chains connected together at their inner ends centrally below the tripod and thence extending outwardly to the lower ends of said legs, and means of ring character on the outer ends of said chains to receive and restrain the lower ends of said legs, said positioning and controlling means being a unitary structure separate from the tripod and resting on the floor and at the ends of the chains freely and detachably receiving and confining the extreme lower ends of the tripod legs and having no permanent connection therewith.

2. A tripod having foldable legs, and means for positioning and controlling the spread of said legs and to be placed on the floor under the tripod, comprising three flexible chains connected together at their inner ends centrally below the tripod and thence extending outwardly to the lower ends of said legs, and means of ring character on the outer ends of said chains to receive and restrain the lower ends of said legs, said chains having means for shortening them to vary the spread of said legs, said positioning and controlling means being a unitary structure separate from the tripod and resting on the floor and at the ends of the chains freely and detachably receiving and confining the extreme lower ends of the tripod legs and having no permanent connection therewith.

3. A tripod having foldable legs, and means for positioning and controlling the spread of said legs and to be placed on the floor under the tripod, comprising a central triangular member, three flexible chains connected together at their inner ends by said member and thence extending outwardly to the lower ends of said legs, and means of ring character on the outer ends of said chains to receive and restrain the lower ends of said legs, said chains having hooks to engage appropriate links thereof when the chains are looped to shorten them, and maintain the chains in their shortened condition, said positioning and controlling means being a unitary structure separate from the tripod and resting on the floor and at the ends of the chains freely and detachably receiving and confining the extreme lower ends of the tripod legs and having no permanent connection therewith.

4. A tripod having foldable legs, and means for positioning and controlling the spread of said legs and to be placed on the floor under the tripod, comprising a central member, three flexible chains connected together at their inner ends by said member and thence extending outwardly to the lower ends of said legs and cups on the outer ends of said chains having rounded bottom surfaces and adapted to receive and hold the lower ends of said legs, said cups having openings on one side and the outer ends of said chains having snap-hooks to engage said cups at said openings, said positioning and controlling means being a unitary structure separate from the tripod and resting on the floor and at the ends of the chains freely and detachably receiving and confining the extreme lower ends of the tripod legs and having no permanent connection therewith.

Signed at New York city, in the county of New York and State of New York, this 4th day of April, A. D. 1921.

FRANK A. WEEKS.